(12) United States Patent
Asada et al.

(10) Patent No.: US 7,186,028 B2
(45) Date of Patent: Mar. 6, 2007

(54) HYDRODYNAMIC BEARING DEVICE

(75) Inventors: Takafumi Asada, Hirakata (JP); Tsutomu Hamada, Hirakata (JP); Hideaki Ohno, Sennan (JP); Yasunori Tokunou, Saijyou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 104 days.

(21) Appl. No.: 11/071,212

(22) Filed: Mar. 4, 2005

(65) Prior Publication Data
US 2005/0201645 A1   Sep. 15, 2005

(30) Foreign Application Priority Data
Mar. 12, 2004   (JP) .............................. 2004-069857

(51) Int. Cl.
*F16C 17/02* (2006.01)
(52) U.S. Cl. ..................... 384/114; 384/279; 384/902
(58) Field of Classification Search ................ 384/114, 384/119, 120, 107, 279, 902
See application file for complete search history.

(56) References Cited

FOREIGN PATENT DOCUMENTS

| JP | 61006426 A | 1/1986 |
|---|---|---|
| JP | 2003322145 A | 11/2003 |

*Primary Examiner*—Lenard A. Footland
(74) *Attorney, Agent, or Firm*—Steptoe & Johnson LLP

(57) ABSTRACT

A hydrodynamic bearing device capable of inhibiting leakage of a working fluid to an outside of a bearing and preventing reduction in radial bearing rigidity, and capable of keeping a gap between a thrust bearing and a radial bearing favorable and rotating stably. The hydrodynamic bearing device includes a shaft relatively rotatably inserted into a bearing hole of a sleeve, a radial bearing surface having dynamic pressure generating grooves formed on at least one of an outer peripheral surface of the shaft and an inner peripheral surface of the sleeve, and a gap filled with a working fluid between the shaft and the sleeve. The shaft is made of high manganese chrome steel or stainless steel, and the sleeve is entirely made of sintered metal of metal particles including at least 60% by weight of iron or copper. Resin, metal or water glass is impregnated in pores on a surface of the sintered metal and cured. Thereby, leakage of the working fluid to the outside of the bearing from the sleeve can be inhibited, and reduction in the pressure inside the bearing can be prevented.

7 Claims, 8 Drawing Sheets

F I G. 8
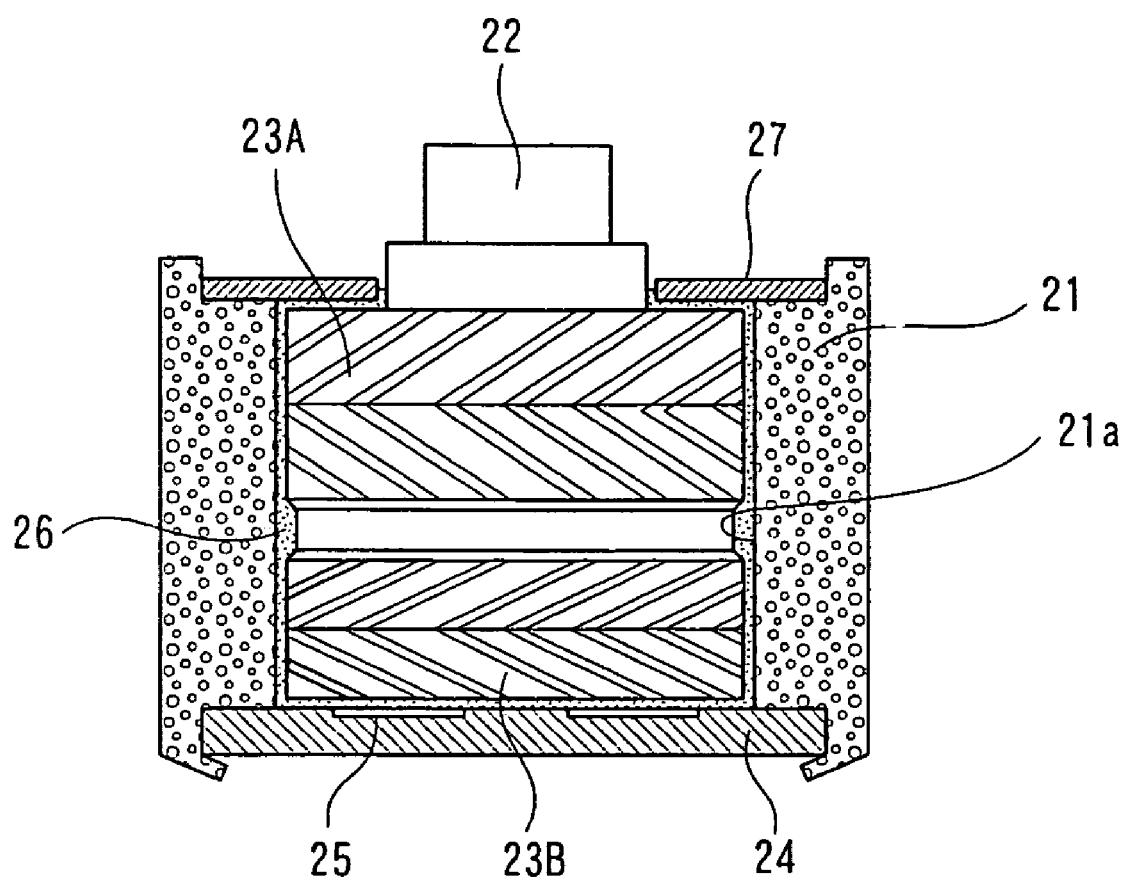

HYDRODYNAMIC BEARING DEVICE

FIELD OF THE INVENTION

The present invention relates to a hydrodynamic bearing device using a dynamic pressure hydraulic bearing. The hydrodynamic bearing device of the present invention can be applied to a hydrodynamic bearing device especially suitable for motors or the like of a hard disc unit or the other disc units, but it can be applicable to the other units. The hydrodynamic bearing device of the present invention is especially suitable for the case using oil (lubricating oil) as a working fluid, but it is possible to apply the device to a hydrodynamic bearing device using air as a working fluid, and further it is also possible to apply the device to hydrodynamic bearing devices using gases other than air as the working fluid.

BACKGROUND OF THE INVENTION

In a recording apparatus or the like using a disc or the like, its memory capacity increases and the transferring speed of the data becomes high in recent years. Therefore, a bearing device used in this kind of recording apparatus needs rotating function at high speed with high accuracy, and a hydrodynamic bearing device is used in its rotating main shaft portion.

Hereinafter, one example of a conventional hydrodynamic bearing device will be explained with reference to FIGS. 9 to 13.

As shown in FIGS. 9 and 10, a sleeve body 30 having a bearing hole 30a is constructed by sintered metal made by sintering metallic particles of copper alloy or the like, and is integrally inserted and fixed into an inside of a sleeve cover 31 which is made by working metal or resin. A sleeve is constructed by the sleeve body 30 and the sleeve cover 31. A shaft 32 is rotatably fitted in the bearing hole 30a of the sleeve body 30. The shaft 32 integrally has a thrust flange 33, the thrust flange 33 is housed in a space part 42 surrounded by the sleeve body 30, the sleeve cover 31 and the thrust plate 34, and the thrust flange 33 is rotatably provided in a posture sandwiched by the thrust plate 34 and the sleeve body 30 with both surfaces opposed to the thrust plate 34 and the sleeve body 30.

A rotor hub 35 is fixed to the shaft 32, and a rotor magnet 36 is fixed to an inner periphery of a large diameter part of the rotor hub 35. A motor stator 37 is mounted to a base 38 to oppose to the rotor magnet 36. Dynamic pressure generating grooves 39A and 39B are provided in at least one of an inner peripheral surface of the bearing hole 30a of the sleeve body 30 and an outer peripheral surface of the shaft 32 which opposes to this, and a dynamic pressure generating groove 40A is provided in opposed surfaces of the thrust flange 33 and the thrust plate 34. In accordance with necessity, a dynamic pressure generating groove 40B is provided in at least one of opposed surfaces of the thrust flange 33 and the sleeve body 30, and oil 41 as a working fluid is filled in a gap between the shaft 32 and the sleeve body 30 which the dynamic pressure generating grooves 39A, 39B, 40A and 40B face and a space part 42 in which the thrust flange 33 is placed.

An operation of the conventional hydrodynamic bearing device constructed as above will be explained by using FIGS. 9 and 10. In FIG. 9, when the motor stator 37 is energized, a rotating magnetic field occurs first, and the shaft 32, the thrust flange 33 and the rotor magnet 36 rotate integrally with the rotor hub 35. At this time, the dynamic pressure generating grooves 39A, 39B, 40A and 40B causes the oil 41 to generate pumping pressure, and the surface in which the dynamic pressure generating grooves 39A, 39B, 40A and 40B are formed floats with respect to the opposed surface and rotates without contacting the opposed surface. Namely, at the location of the dynamic pressure generating grooves 39A and 39B, a radial bearing for rotatably supporting in the state having a predetermined gap in a radial direction is formed, and at the locations of the dynamic pressure generating grooves 40A and 40B, a thrust bearing for rotatably supporting in a state having a predetermined gap in a thrust direction is formed.

According to the hydrodynamic bearing device of the above-described construction, by forming the sleeve body 30 of sintered metal, it is possible to put the sintered product into the mold and press-forming it, and therefore, the dynamic pressure generating grooves 39A, 39B, 40A and 40B can be manufactured with high accuracy while saving time and effort. As a result, it is not necessary to perform groove machining by precision cutting or the like in the tail end process as in the case where a sleeve body is manufactured by using an ordinary metal material, and the manufacturing cost can be reduced.

However, the hydrodynamic bearing device of the conventional construction as described above has the following problems.

As shown in FIG. 10, the shaft 32 is roatably inserted into the bearing hole 30a of the sleeve body 30, and the sleeve body 30 formed of sintered metal is made of a material having pores 30d of about 2 to 15% by area therein, including copper alloy of 60% by weight or more, and having the pores 30d impregnated with the oil 41 at low pressure. Accordingly, if there is rise in the temperature of the inside of the bearing or the like, the oil 41 with which the sleeve body 30 is impregnated is to go out of the sleeve body 30, and if the outer peripheral surface of the sleeve body 30 is exposed to the outside, the oil 41 sometimes flows out to the bearing outer portion and contaminates the ambient air.

FIG. 11 shows a surface picture of the sleeve body 30, and as shown in FIG. 11, the sleeve body 30 has the pores 30d in the surface. Therefore, the pressure of 2 atmospheric pressure to 5 atmospheric pressure, which occurs to the inside of the bearing by the actions of the dynamic pressure generating grooves 39A, 39B, 40A and 40B, leaks from the pores 30d of the surface by about 30%, which reduces rigidity of the radial bearing by 30%, and the shaft 32 sometimes cannot perform non-contact rotation, but contacts the sleeve body 30 during rotation and is rubbed. FIG. 12 shows the calculation value of the ratio (%) by which the radial bearing rigidity reduces in accordance with the area porousness rate (%) of the surface. FIG. 11 is the enlarged picture of the range of 0.3 mm×0.32 mm in the sintered metal surface, the black portions show the pores 30d and the white portions show the metal portion (with shine).

Accordingly, the hydrodynamic bearing device of the conventional construction needs the sleeve cover 31 to cover the sleeve body 30 from the outer periphery, and the sleeve cover 31 suppresses leakage of the oil 41 outside the bearing to the minimum.

In order to cope with such a problem, as the construction to inhibit leakage of the oil 41 outside the bearing, a hydrodynamic bearing device in which the surface of the sleeve body 30 fitted in the sleeve cover 31 is covered with the covering layer with impermeability for oil is disclosed in Patent document 1 (Japanese Patent Laid-Open No. 2003-322145) or the like.

According to this construction, the surface of the sleeve body 30 is covered with the covering layer with impermeability for oil, and therefore, oil does not enter the pores of the sleeve body 30, as a result of which, the oil 41 can be prevented from flowing outside the bearing through the sleeve body 30. Reduction in pressure of the oil 41 inside the bearing can be also prevented, and reduction in the radial bearing rigidity can be prevented.

However, the hydrodynamic bearing device with the above-described conventional construction has the following problems.

As shown in FIG. 13, when the sleeve body 30 which is inserted and fixed into the sleeve cover 31 is inclined and fixed, a deviation occurs to perpendicularity between the bearing hole 30a and the thrust plate 34, therefore causing the problems that stable support cannot be made with the gaps of the thrust bearing and the radial bearing become uneven, and the shaft 32 rubs against the inner surface of the sleeve body 30 and cannot make rotation without contact when the aforesaid deviation is large. Since the operation of inserting and fixing the sleeve body 30 into the sleeve cover 31 is needed and the sleeve body 30 and the sleeve cover 31 are separately provided, there is the disadvantage that the number of components increases correspondingly.

FIG. 14 shows the calculation values of the radial bearing radius gap (μm), viscosity of the oil 41 (mm$^2$/s) and the bearing rotation friction torque (g/cm) in each temperature. The linear expansion coefficient of the copper alloy of the sleeve body 30 is $20.5 \times 10^{-6}$ (/° C.) while the linear expansion coefficient of the martensitic stainless steel of the shaft 32 is $10.3 \times 10^{-6}$ (/° C.), and therefore, there are the problems that the viscosity of the oil 41 becomes extremely large at low temperature while the inner diameter of the sleeve body 30 becomes so small that the radius gap between the bearing hole 30a and the shaft 32 becomes small, and thus the rotation becomes low. Accordingly, in the motor using this hydrodynamic bearing device, electric current consumption increases at the low temperature.

DISCLOSURE OF THE INVENTION

The present invention is to solve the above described problems, and has an object to provide a hydrodynamic bearing device capable of inhibiting leakage of a working fluid such as oil outside a bearing and preventing reduction in radial bearing rigidity, and capable of keeping a gap between a thrust bearing and a radial bearing favorable and rotating stably without contact, and capable of keeping performance of the bearing favorable at low temperature.

The present invention is a hydrodynamic bearing device in which a shaft is relatively rotatably inserted into a bearing hole of a sleeve, a radial bearing surface having dynamic pressure generating grooves is provided on at least one of an outer peripheral surface of the shaft and an inner peripheral surface of the sleeve, a gap between the shaft and the sleeve is filled with a working fluid, and a rotor hub at a rotating side is supported rotataly with respect to a base at a fixed side. The shaft fixed to the rotor hub or the base is constituted of high manganese chrome steel or stainless steel, and the entire sleeve fixed to the base or the rotor hub is constituted of sintered metal comprising metal particles including 60% by weight or more of iron or copper, and resin, metal or water glass is impregnated in pores existing on a surface of the sintered metal and is cured.

In this construction, the pores existing on the surface of the sintered metal constructing the sleeve are impregnated with resin, metal or water glass and are cured, whereby the working fluid such as oil can be inhibited from leaking outside the bearing from the pores on the surface of the sleeve, reduction in pressure inside the bearing can be prevented and reduction in radial bearing rigidity can be prevented, thus making it possible to enhance reliability. By constructing the entire sleeve by the sintered metal, the gap between the thrust bearing and the radial bearing can be kept favorable and the number of components and assembly steps can be reduced.

Iron is used for the component of the metal particles which are to be the raw material of the sleeve constituted of the sintered metal so that the linear expansion coefficient of the shaft becomes larger than the linear expansion coefficient of the sleeve, and thereby, the gap between the sleeve and the shaft is widened at low temperature. Even when the viscosity of the oil becomes high at low temperature, the relative rotation of the shaft can be prevented from being slow, and increase in the electric current consumption at low temperature can be suppressed to the minimum in the motor or the like using this hydrodynamic bearing device.

BRIEF DESCRIPTION OF THE DRAWINGS

FIG. 8 is a sectional view of a hydrodynamic bearing device according to a second embodiment of the present invention;

DESCRIPTION OF THE EMBODIMENT(S)

Hereinafter, a hydrodynamic bearing device in embodiments of the present invention will be explained with reference to FIGS. 1 to 8.

(First Embodiment)

Figure 1:
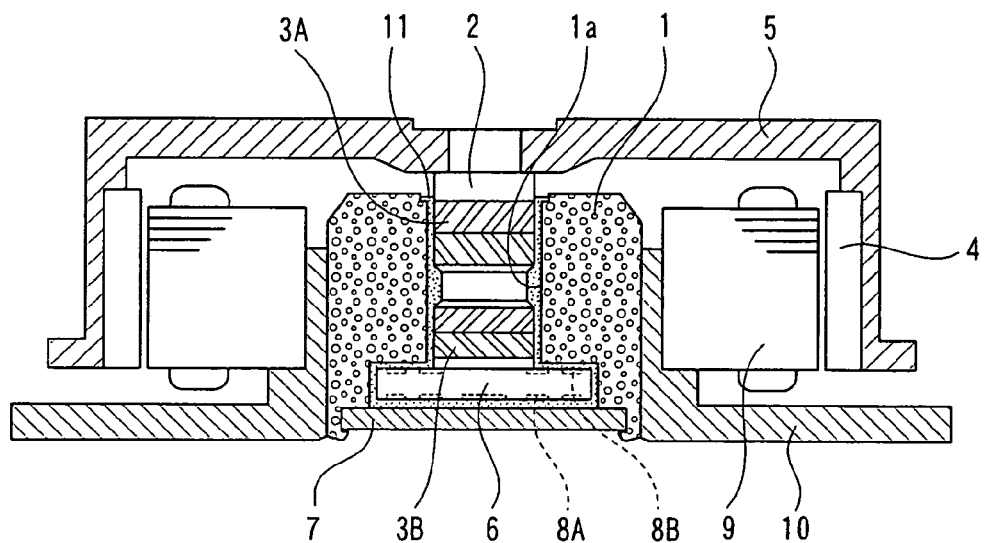
FIG. 1 is a sectional view of a hydrodynamic bearing device according to a first embodiment of the present invention.

FIG. 1 is a sectional view of a hydrodynamic bearing device according to a first embodiment of the present invention. A shaft 2 is rotatably inserted into a bearing hole 1a of a sleeve 1, and a radial bearing surface having dynamic pressure generating grooves 3A and 3B constituted of pattern-shaped shallow grooves is provided at least one of an outer peripheral surface of the shaft 2 and an inner peripheral surface of the sleeve 1. A rotor hub 5 having a rotor magnet 4 in an inner periphery of its large diameter portion is mounted at one end (upper part in FIG. 1) side of the shaft 2, and a thrust flange 6 is integrally mounted at the other end (lower part in FIG. 1) side of the shaft 2 to be perpendicular to the shaft 2. A bearing surface at the lower end side of the thrust flange 6 opposes to a thrust plate 7, and the thrust plate 7 is fixed to the sleeve 1. A dynamic pressure generating groove 8A in a spiral or a herringbone pattern is formed on at least one of the surfaces of the thrust flange 6 and the thrust plate 7 opposed to each other, and a dynamic pressure generating groove 8B is provided on at least one surface of the top plane part of the thrust flange 6 and the surface to which the sleeve 1 opposed. The sleeve 1 is fixed to a base 10 with a motor stator 9, and a gap between the shaft 2 and the sleeve 1 and a gap between the thrust flange 6 and the thrust plate 7 are filled with oil 11 as a working fluid.

Figure 2:
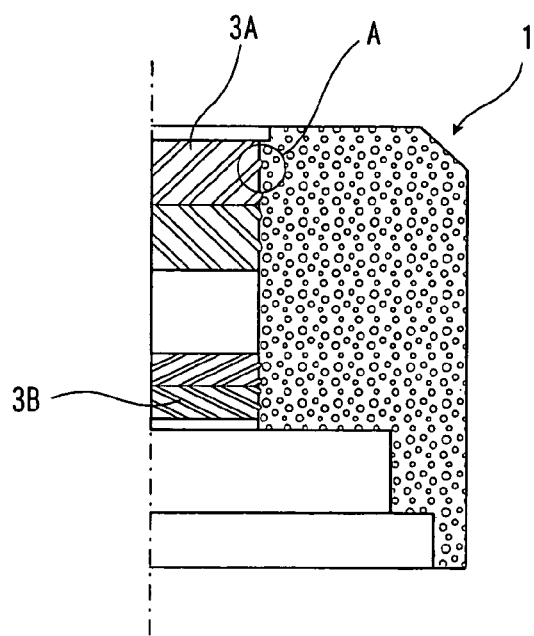
FIG. 2 is a detailed sectional view of a sleeve in the same hydrodynamic bearing device.
Figure 3:
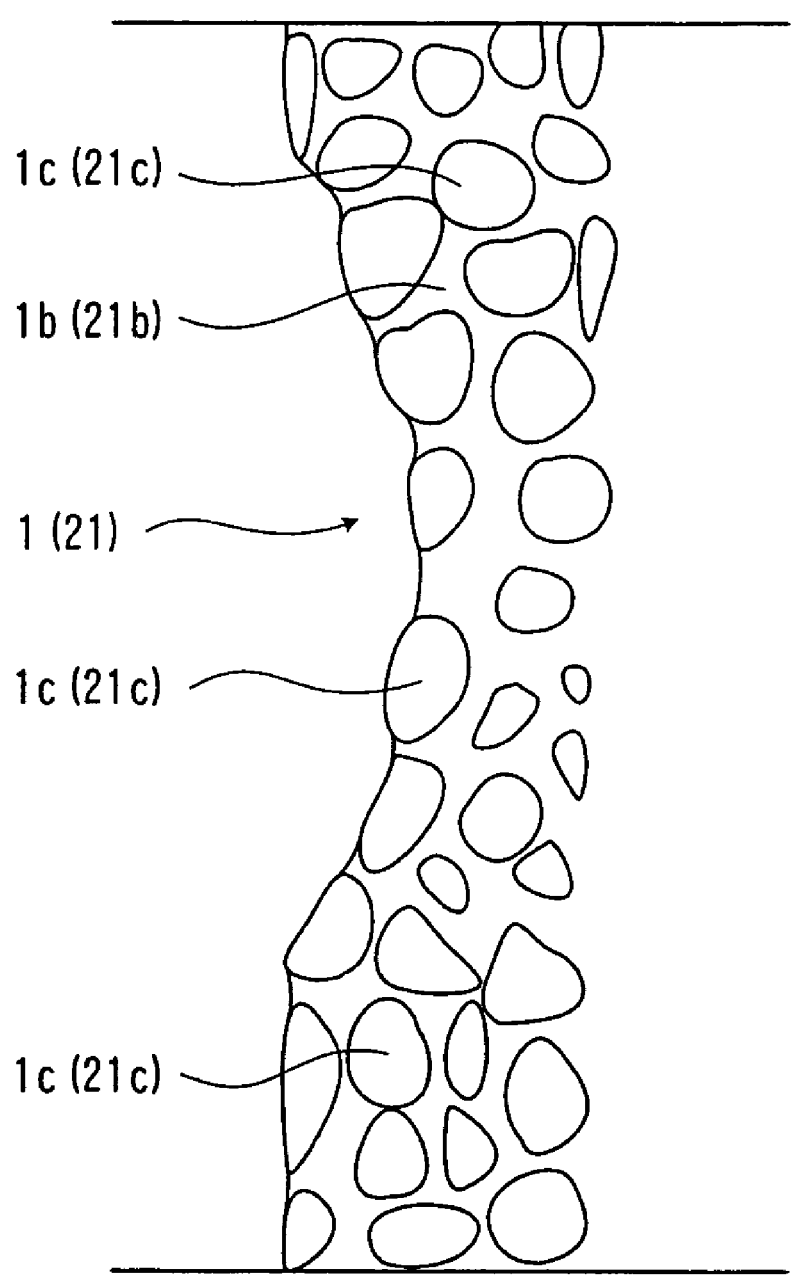
FIG. 3 is an enlarged view of a material surface of the sleeve in the same hydrodynamic bearing device.

FIG. 2 is an enlarged view of the sleeve 1, and the drawing in which the part shown by the symbol A in FIG. 2 is further enlarges is FIG. 3. As shown in FIG. 3, the sleeve 1 is constructed by sintering a number of metal sintered particles 1b, and the spaces (pores) which face the outsides of them, are substantially completely filled with a sealing material 1c.

An operation of the hydrodynamic bearing device as constructed above will be explained. When the motor stator 9 is energized first, a rotating magnetic field occurs, and the rotor magnet 4 starts to rotate with the rotor hub 5 and the shaft 2. When the rotation starts, the dynamic pressure generating grooves 3A, 3B, 8A and 8B cause the oil 11 to generate pumping pressure. Then, the pressure of the bearing parts (the radial bearing part and thrust bearing part) becomes high, and the shaft 2 and the thrust flange 6 float with respect to the sleeve 1 and the thrust plate 7, and rotate without contact the sleeve 1 and the thrust plate 7 with high accuracy. Namely, at the locations of the dynamic pressure generating grooves 3A and 3B, radial bearings for rotatably supporting with a predetermined gap in the radial direction are formed, and thrust bearings for rotatably supporting with a predetermined gap in the thrust direction are formed at the locations of the dynamic pressure generating grooves 8A and 8B. It is possible to fix a disc as one or a plurality of magnetic recording media not shown on the rotor hub 5, and the rotor hub 5 rotates with the discs not shown to perform record or reproduction of electrical signals.

Figure 4:
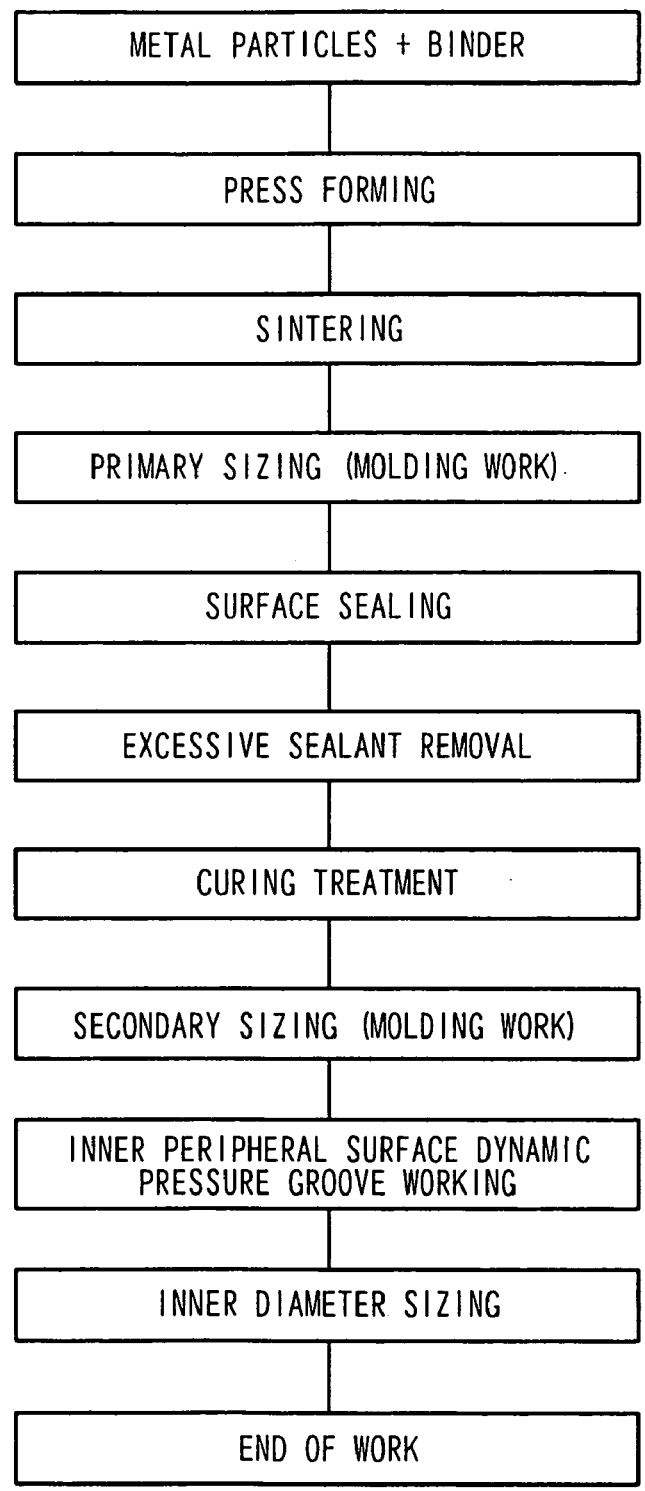
FIG. 4 is a diagram showing a flow of a working process of the sleeve in the same hydrodynamic bearing device.

FIG. 4 shows a flow of the manufacturing step of the sleeve 1. In the first step, the metal sintered particles 1b and a binder (for example, an adhesive) are prepared, in the second step, the powder constituted of the metal sintered particles 1b and the binder is press-formed, and sintered in the third step, the product after sintering is put into the mold in the fourth step, and is press-formed, whereby the inner and outer diameter and the end surface are simultaneously sized. In the fifth step, the sleeve 1 is put into liquid including metal, water glass or the like to impregnate the surface with the liquid, and the inside is also impregnated with the liquid by providing low pressure as necessary, the excessive polymer, metal or water glass attached to the surface of the product is removed in the sixth step, and the polymer, iron or water glass is solidified by curing treatment in the seventh step. Thereafter, the same kind of sizing as the fourth step is performed in the eighth step, the dynamic pressure generating grooves 3A and 3B are worked on the inner peripheral surface of the bearing hole 1a in the ninth step, the final sizing is performed with the method of inserting the pin through the inner peripheral surface of the sleeve 1 in the tenth step, and work of the sleeve 1 is finished. If the sequence of the sixth step (step of removing the component attached to the surface of the product) and the seventh step (curing step) is reversed, no influence is exerted, and the result is the same.

According to the above described working steps, the sleeve 1 with the pores on the surface of the sintered sleeve 1 sealed, which has the bearing hole 1a with favorable quality can be obtained.

Work of the ninth dynamic pressure generating groove is performed by component rolling using a ball as disclosed in Japanese Patent Publication No. 3-68768.

The ninth and tenth working steps are required when the dynamic pressure generating grooves 3A and 3B are worked on the inner peripheral surface of the bearing hole 1a of the sleeve 1, but when the dynamic pressure generating grooves 3A and 3B are separately worked on the outer peripheral surface of the shaft 2, the ninth and tenth steps are not necessary.

If the ninth and tenth steps are not performed after the eighth step, and performed between the fourth and the fifth steps, namely, the work is performed in the order of the aforesaid first, second, third, fourth, ninth, tenth, fifth, sixth, seventh and eighth steps, the same work can be carried out. When the working accuracy is not demanded so much, any one of the fourth sizing work and the eighth sizing work can be omitted.

Figure 5:
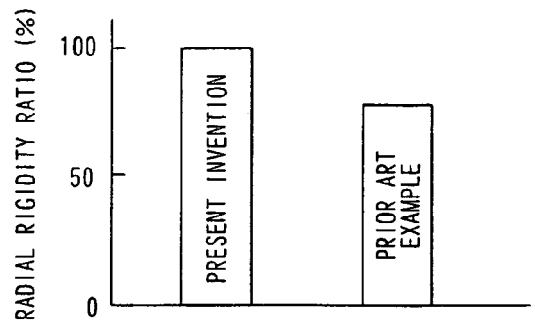
FIG. 5 is a diagram explaining bearing rigidity of the same hydrodynamic bearing device.

According to the present invention, as shown in FIG. 5, the pores on the inner peripheral surface and the like including the bearing parts (radial bearing part and the thrust bearing part) in the sleeve 1 are sealed with the sealing material 1c, and therefore, as compared with the conventional case with the 3% or more of pores at the area ratio, the remaining pores are 0%, and the oil 5 can be prevented from leaking outside the bearing from the pores to enhance the bearing rigidity by about 30%, as a result of which, shaft run-out decreases and the rotational accuracy is enhanced. The sleeve 1 is conventionally cut from a re-cut steel bar or a copper alloy bar by lathe turning by a lathe, and nickel plating is applied to the surface for corrosion prevention and enhancement of abrasion resistance. When nickel plating is applied to the sleeve 1 constituted of the sintered material as in the present invention, the plating solution having corrosiveness remains in the sintered material, and the solution sometimes exerts an adverse effect on the sintered material later. On the other hand, in the present invention, the work process for searing the surface is adopted, and therefore, the plating solution does not enter the inside of the sleeve 1, thus causing no problem.

In the sleeve 1, the surface of the sintered material is sealed with resin, water glass or the like, and therefore, plating can be applied to the surface, and by applying nickel phosphor plating to the surface of this sleeve 1, favorable slip and abrasion resistance are exhibited between the sleeve 1 and the shaft 2 made of high manganese chrome steel and stainless steel, thus making it possible to construct the fluid bearing device with long life.

Figure 6:
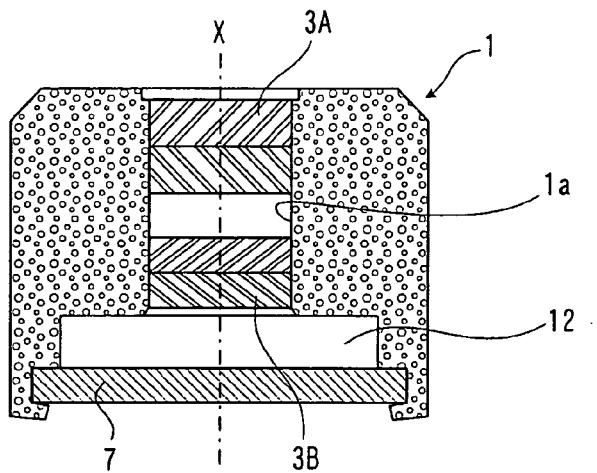
FIG. 6 is a sectional view for explaining working accuracy of the same hydrodynamic bearing device.

As shown in FIG. 6, according to the present invention, the entire sleeve 1 is constructed by the sintered metal, and thereby, the sleeve body and the sleeve cover in the conventional hydrodynamic bearing device can be integrated, thus enhancing accuracy. For example, the perpendicularity of the thrust plate 7 to the bearing hole 1a (the axis is shown by X) of the sleeve 1 can be easily held at 2 micrometers or less. Reference numeral 12 in FIG. 6 denotes a disposition space for the thrust flange 6.

Figure 7:
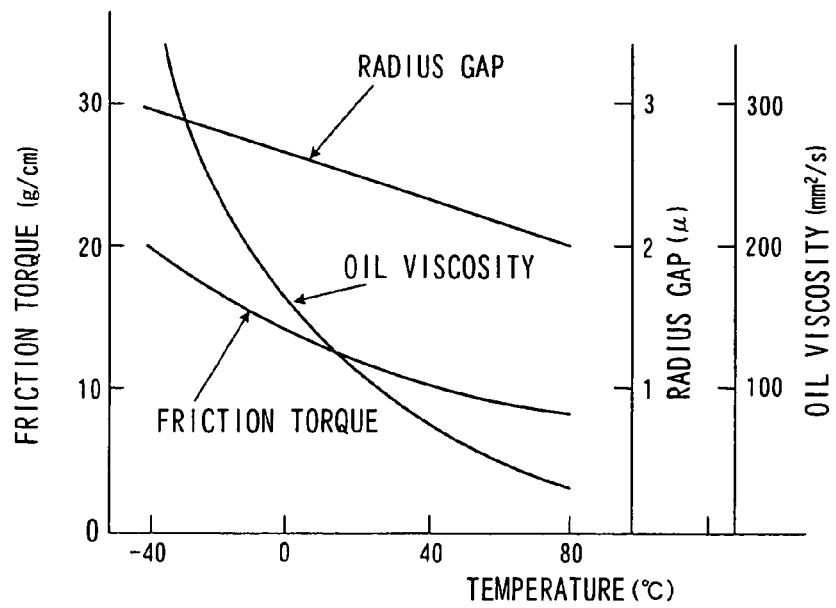
FIG. 7 is a diagram showing performance properties of the same hydrodynamic bearing device.
Figure 9:
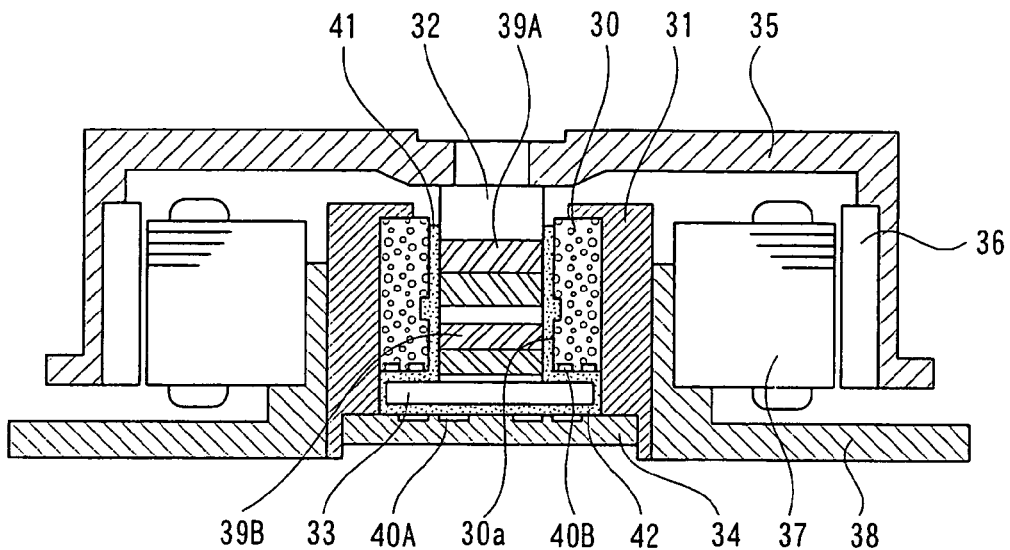
FIG. 9 is a sectional view of a conventional hydrodynamic bearing device.
Figure 10:
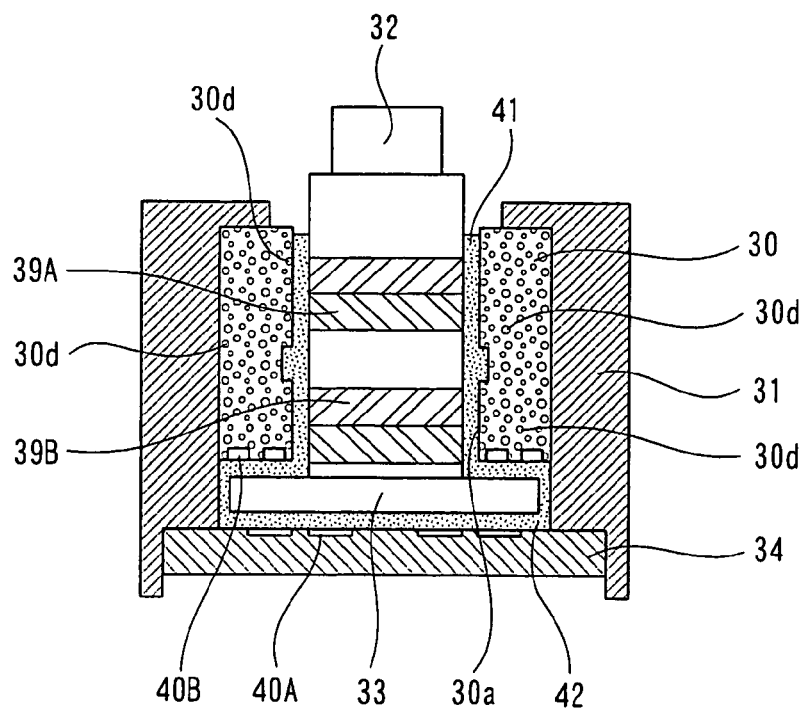
FIG. 10 is an enlarged sectional view of the same conventional hydrodynamic bearing device.
Figure 11:
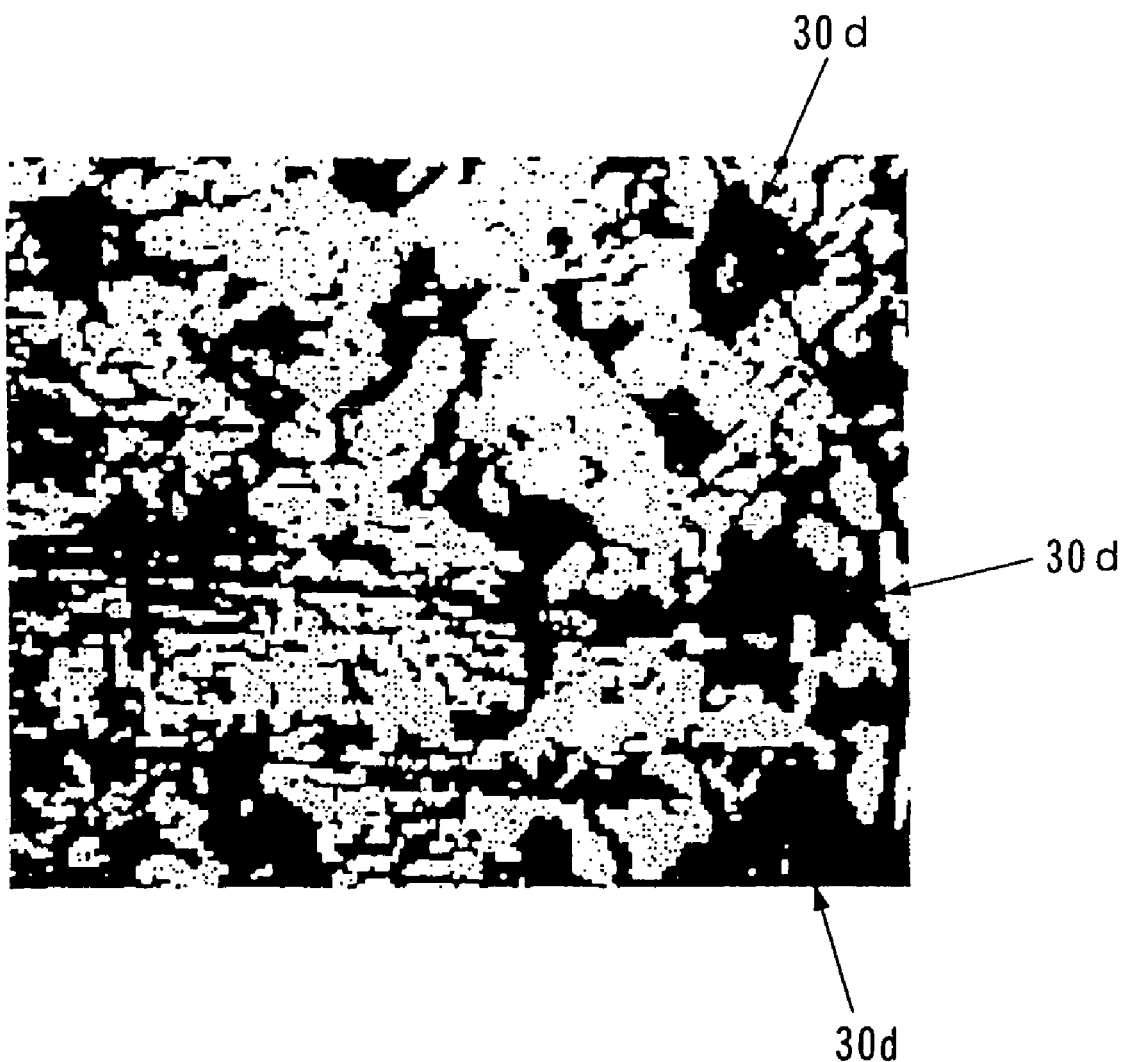
FIG. 11 is a diagram showing a picture taking a surface state of a sleeve of the same conventional hydrodynamic bearing device.
Figure 12:
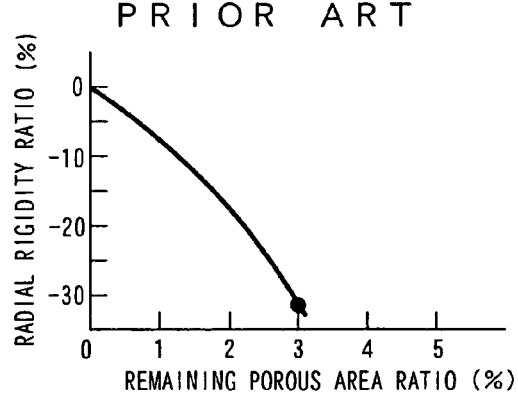
FIG. 12 is a diagram explaining a porousness rate of the sleeve in the same conventional hydrodynamic bearing device.
Figure 13:
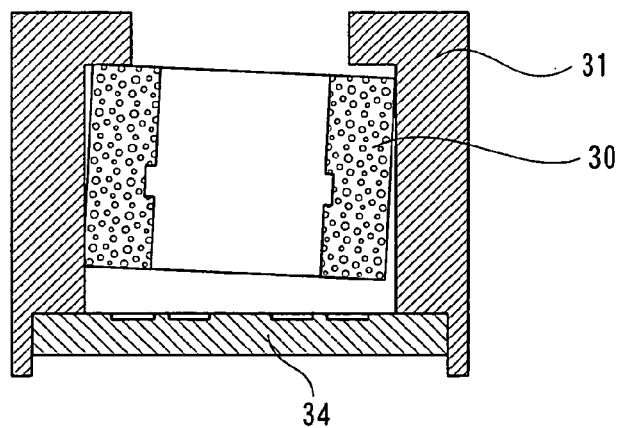
FIG. 13 is a conceptual diagram for explaining accuracy in the same conventional hydrodynamic bearing device.
Figure 14:
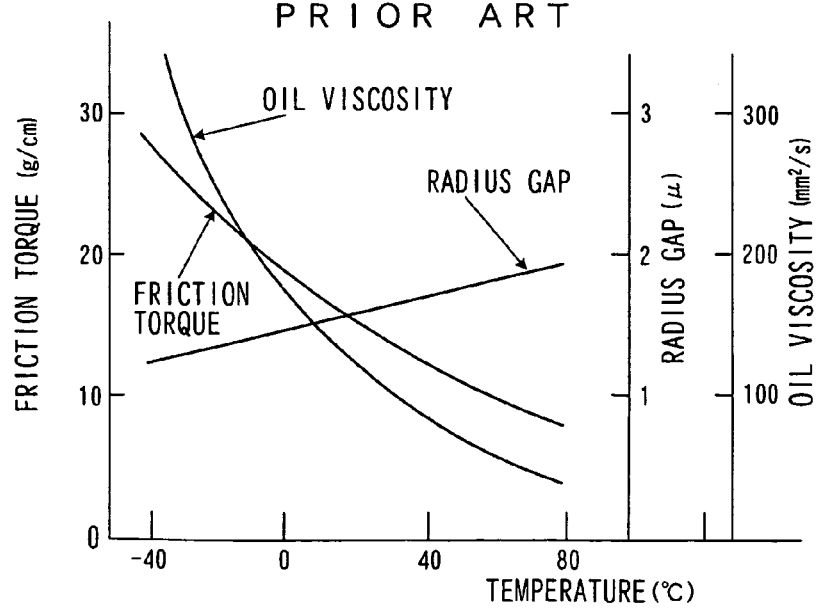
FIG. 14 is a diagram showing performance properties of the same conventional hydrodynamic bearing device.

Next, FIG. 7 shows the radial bearing radius gap (μm (micrometer)), oil viscosity (mm²/s) and the bearing friction torque (g/cm (gram centimeter)) at each temperature. In the present invention, the shaft 2 is constructed by any one of high manganese chrome steel and stainless steel, and 60% by weight or more of the sleeve 1 is constructed by the sintered metal constituted of metal particles including iron or copper. By constructing 90% by weight or more of the sleeve 1 of the sintered metal constituted of iron particles, the linear expansion coefficient of the shaft 2 becomes $16.0 \times 10^{-6} - 17.3 \times 10^{-6} (/° C.)$, and the linear expansion coefficient of the sleeve 1 becomes $11.0 \times 10^{-6} (/° C.)$. Therefore, the radius gap between the bearing hole 1a and the shaft 2 becomes large at low temperature, and the rotation becomes high. Accordingly, even when the viscosity of the oil 11 increases at low temperature, the rotational friction torque of the hydrodynamic bearing device does not become so large, and therefore, it is possible to suppress the electric current consumption of the motor to be small. The concrete numeral values are as shown in FIG. 7.

By using the sintered metal constituted of iron particles having 50% by weight or more of iron particles of stainless steel as the sleeve 1, anticorrosion effect is provided to the sleeve 1 after sealing treatment, and rust does not occur for a long period of time, whereby high reliability is provided and there is no fear of occurrence of rust on the surface or contamination of the periphery by the particles of the rust.

By using the sintered metal constituted of iron particles containing 50% or more of iron particles of martensitic stainless steel or ferrite stainless steel as the sleeve 1, the linear expansion coefficient of the shaft 2 is $16.0 \times 10^{-6} - 17.3 \times 10^{-6} (/° C.)$ while the linear expansion coefficient of the sleeve 1 is $10.3 \times 10^{-6} (/° C.)$, and therefore, the radius gap between the bearing hole 1a and the shaft 2 becomes large at low temperature, and the rotation becomes high. Accordingly, even when the viscosity of the oil 11 increases at low temperature as shown in FIG. 7, the rotational friction torque of the hydrodynamic bearing device does not become so large, and the electric current consumption of the motor can be suppressed to be small. More specifically, in the present invention, martensitic stainless steel of SUS416, SUS420 and SUS440, ferrite stainless steel such as SUS410L and SUS430 are selected for the material of the iron powder.

The pores remaining on the surface of the sintered metal in the sleeve 1 are impregnated with acrylate resin or 4-fluorinated ethylene resin as the sealing material 1c at low pressure, and curing treatment is further applied to this resin, whereby in the case of the oil 11 being ester oil, olefin oil, and mineral oil, no chemical reaction occurs between the oil 11 and the sealing material 1c, and the advantage of capable of obtaining the hydrodynamic bearing device stable for a long period of time is provided.

In the above described embodiment, the case where the shaft 2 rotates with respect to the fixed sleeve 1 is explained, but the present invention is not limited to this, and the same sleeve 1 can be applied similarly to the construction of a so-called fixed shaft type in which the sleeve 1 rotates integrally with the rotor hub 5 and the shaft 2 is fixed to the base 10.

(Second Embodiment)

FIG. 8 is a sectional view of a hydrodynamic bearing device according to a second embodiment of the present invention. A shaft 22 is rotatably inserted into a bearing hole 21a of a sleeve 21, and a radial bearing surface having dynamic pressure generating grooves 23A and 23B constructed by pattern-shaped shallow grooves is provided on at least one of an outer peripheral surface of the shaft 22 and an inner peripheral surface of the sleeve 21. A thrust bearing surface is formed at a lower end surface of the shaft 22 to be perpendicularly to the shaft 22, the thrust bearing surface is opposed to a thrust plate 24, the thrust plate 24 is fixed to the sleeve 21, a dynamic pressure generating groove 25 in a spiral or a herringbone pattern is formed on any one of the thrust bearing surface and the surface of the thrust plate 24, and a gap between the shaft 22 and the sleeve 21 and a gap between the shaft 22 and the thrust plate 24 are filled with oil 26 as the lubricant. The sleeve 21 is constructed by sintering a number of metal sintered particles 21b (see FIG. 3), and spaces between the metal sintered particles 21b are substantially completely filled with the sealing material 21c. Reference numeral 27 in FIG. 8 denotes a fall-off prevention plate for preventing the shaft 22 from removing from the bearing hole 21a of the sleeve 21.

The same materials as those of the hydrodynamic bearing device of the above-described first embodiment are used as the sintered metal material of the sleeve 21 and the material of the shaft 22, and their manufacturing processes and the working methods are used similarly.

An operation of the hydrodynamic bearing device as constructed above will be explained. In FIG. 8, when the shaft 22 starts rotation, the dynamic pressure generating grooves 23A, 23B and 25 cause the oil 26 to generate pumping pressure, the pressure of the bearing parts (radial bearing parts and the thrust bearing parts) are enhanced, and the shaft 22 floats with respect to the sleeve 21 and the thrust plate 24 and rotates without contact with high accuracy.

According to this hydrodynamic bearing device, the same operational effects as in the hydrodynamic bearing device of the above described first embodiment can be obtained.

What is claimed is:

1. A hydrodynamic bearing device, comprising:
a shaft relatively rotatably inserted into a bearing hole of a sleeve;
a radial bearing surface having dynamic pressure generating grooves and formed on at least one of an outer peripheral surface of the shaft and an inner peripheral surface of the sleeve;
a gap formed between the shaft and the sleeve and filled with a working fluid; and
a rotor hub located at a rotating side and supported rotataly with respect to a base at a fixed side, wherein
the shaft fixed to the rotor hub or the base is constituted of high manganese chrome steel or stainless steel, and
the entire sleeve fixed to the base or the rotor hub is constituted of sintered metal comprising metal particles including at least 60% by weight of iron or copper, and resin, metal or water glass is impregnated in pores existing on a surface of the sintered metal and cured.

2. The hydrodynamic bearing device according to claim 1, wherein the sleeve is constituted of sintered metal comprising at least 90% by weight of iron particles.

3. The hydrodynamic bearing device according to claim 1, wherein the sleeve is constituted of the sintered metal comprising iron particles including at least 50% by weight of iron particles of stainless steel.

4. The hydrodynamic bearing device according to claim 3, wherein the iron particles of stainless steel comprises iron particles including at least 50% by weight of iron particles of ferrite stainless steel or martensitic stainless steel.

5. The hydrodynamic bearing device according to claim 1, wherein the sleeve is formed by impregnating the pores existing on the surface of the sintered metal with acrylate resin and subjecting the resin to a curing treatment.

6. The hydrodynamic bearing device according to claim 1, wherein the sleeve is formed by impregnating the pores existing on the surface of the sintered metal with 4-fluorinated ethylene resin and subjecting the resin to a curing treatment.

7. The hydrodynamic bearing device according to claim 1, wherein the sleeve is formed by impregnating the pores existing on the surface of the sintered metal with resin, metal or water glass, and subjecting the surface of the sleeve to nickel phosphor plating.

* * * * *